C. M. MAISEL.
TWINE HOLDER.
APPLICATION FILED JUNE 29, 1909.
966,758.
Patented Aug. 9, 1910.
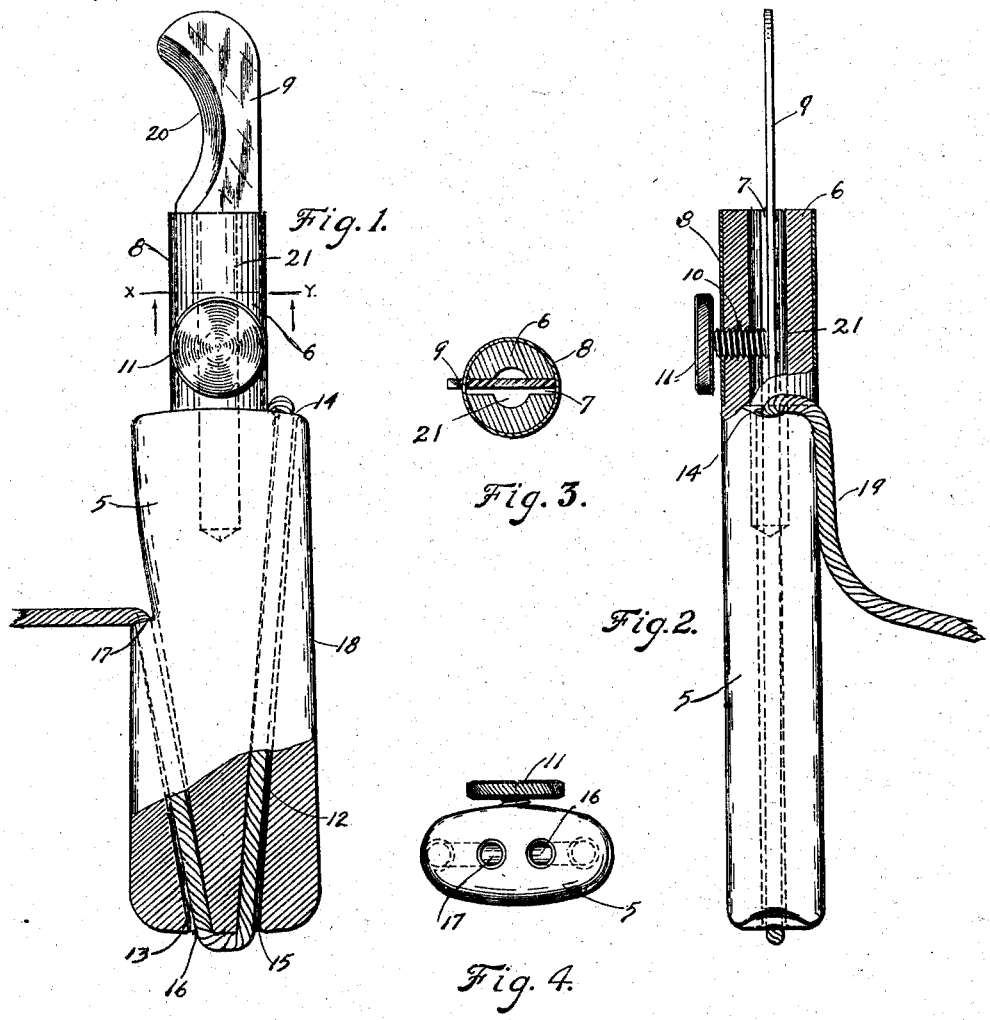
WITNESSES:
INVENTOR
Conrad M. Maisel
BY
ATTORNEY.

UNITED STATES PATENT OFFICE.

CONRAD M. MAISEL, OF BUFFALO, NEW YORK, ASSIGNOR OF ONE-HALF TO HENRY STRADTMAN, OF SLOAN, NEW YORK.

TWINE-HOLDER.

966,758.  Specification of Letters Patent.  Patented Aug. 9, 1910.

Application filed June 29, 1909. Serial No. 505,020.

*To all whom it may concern:*

Be it known that I, CONRAD M. MAISEL, a citizen of the United States, and a resident of Buffalo, county of Erie, and State of New York, have invented certain new and useful Improvements in Twine-Holders, of which the following is a full, clear, and exact description.

My invention relates generally to twine holders and more particularly to those designs in which the twine is attached or carried during the time that it is being used for tying up bundles or other articles.

My chief object in producing the invention herein described has been to provide means for allowing the operator to firmly grasp the twine holder and put any desired tension on the twine and at the same time relieve the hand of the operator from being uncomfortably affected by the strain thus put upon the twine. In other words I have sought to produce a device in which a locking loop of the twine could be effected whenever desired by the operator and thus any desired tension might be placed upon the twine by the hand of the operator without such tension producing any uncomfortable or undesired pressure on the hand.

With these and other objects in view I have produced a twine holder of very simple construction having a stock or handle of such shape that it will most naturally fit in the hand of the operator and at the same time provide a means for effecting a locking loop of the twine as long as the twine is passed through it. Moreover I have produced a twine holder in which a knife or any other suitable severing means can be easily applied to it and readily removed therefrom and thus be used for severing the twine after it has been tied around the bundles or other articles to which it is applied.

The many advantages of the twine holder herein described will be clear to those who are accustomed to apply twine to such articles as require a heavy strain to be put on the twine when they are properly tied up. My invention is particularly adapted for the use of butchers and particularly where it is necessary to have securely tied portions of meat in order to retain them in desired forms for retail use but it will be clear that my twine holder is likewise readily adaptable for efficient use for many other purposes.

Referring to the accompanying drawings forming part of this specification in which similar marks of reference refer to corresponding parts throughout the several figures and in which: Figure 1 is a side elevation of my invention showing the lower portion of the stock broken away. Fig. 2 is a side elevation showing part of the upper portion broken away and a knife blade secured in the upper portion. Fig. 3 is a section taken on the line $x$—$x$ of Fig. 1 looking in the direction of the arrows adjoining such section line. Fig. 4 is a bottom view of my invention.

My twine holder comprises a stock 5 which is of suitable size and form to be grasped in the hand of the operator. This stock may be made of any suitable material, preferably of aluminum. Preferably secured to the upper end of the stock is a cylindrical projection 6 which is provided with a slot 7 cut diametrically across such cylindrical projection and in this slot a knife blade 9 is adapted to be placed. Preferably a metallic shell or tube 8 slips over the cylindrical projection 6. Through the portion 6 and through the shell or tube 8 an internal screw-thread 10 is cut and a set-screw 11 provided with knurled head is adapted to engage with such internal screw-thread 10. When the knife blade 9 is placed within the slot 7 the set-screw 11 is engaged with the internal screw-thread 10 and screwed to place so that the knife blade is thus locked rigidly within the cylindrical portion 6.

It is not essential to my invention that the cylindrical portion 6 be provided with a knife blade 9 but manifestly when it is so used there will be provided, integral with the twine holder, a convenient means for severing the twine. Again if the operator does not desire to use my twine holder for tying purposes it will be evident that the stock 5 may be conveniently used as a knife handle and any knife blade suitable for the work to be performed may be inserted within the cylindrical projection and a very efficient form of knife will thus be provided.

For the foregoing reasons my twine holder is preferably made with the projection 6 forming an integral part of the twine holder, but I do not wish to be confined to this specific construction.

When the cylindrical portion 6 is used as described it is preferably provided with a rounded recess 21 which is clearly indicated in Fig. 3 and which is made in the center of the cylindrical projection 6 and extends longitudinally down into the stock 5 for a short distance (see Fig. 1) thereby making it adaptable for knives or other suitable cutters having round shanks.

The stock 5 is provided with suitably formed channels 12 and 13 which terminate at 14 and 15, 16 and 17, respectively. These terminals at 14, 15, 16, and 17 are preferably chamfered or rounded off as shown so as to give little friction to the twine passing through the channels. In and through the said channels 12 and 13 the twine is threaded, being introduced first at 14 then passed downwardly through the stock and emerging at 15. It is then again introduced at 16 and threaded through the channel 13 passing out of the stock at 17.

Having thus described the several parts of my invention I will now describe the method of using it.

The stock 5 of the twine holder is grasped by the hand of the operator so that the edge 18 lies against the palm of the hand and the end of the twine which passes out of the stock at 17 is preferably placed between the first and second fingers of the hand. That portion of the twine which is marked 19 (Fig. 2) and which is on the entering side of the stock is preferably held in the position shown in Fig 2 by the operator's fore finger and the twine is allowed to pass under such fore finger and through the stock until the desired windings about the bundles to be tied have been made.

It will be clear that when the twine is not held tightly at 19 it will pass through the stock 5 very freely but when sufficient twine has been passed through the stock and it is desired to put a tension on the twine preliminary to tying it on bundles a light pressure may be placed upon the twine at 19 with the fore finger and thus the twine will be locked in a locking loop through the stock so that any desired tension may be placed upon the twine without such tension injuriously or uncomfortably affecting the operator's hand. In this last described operation no change of position of the stock with reference to the operator's hand is necessary but the desired locking of the twine so as to provide the tension is effected by a suitable pressure placed on the portion 19 of the twine which passes underneath the fore finger of the operator's hand. After the twine has been drawn as tense as desired it may be then tied about the bundle and can then be severed entirely by the knife blade 9 or with any other suitable severing means.

It will be clear that some modifications may be made from the invention herein described without departing from its spirit and I do not therefore wish to be limited to the exact construction shown.

Having thus described my invention what I claim is:

A twine holder comprising a stock, a longitudinal twine channel passing interiorly through said stock and extending from a point near the edge at the upper end of said stock to the lower end thereof at a point near its center, and a second longitudinal twine channel passing through said stock and extending from the said lower end at the opposite side and near said center to a point at its edge which is substantially midway between said upper and lower ends of said stock, whereby twine entering at the upper end of said stock and passing through said channels may be free to slide or be firmly locked by being folded over the said stock at the upper end and gripped by the hand holding the same.

In testimony whereof I have hereunto set my hand in the presence of two witnesses.

CONRAD M. MAISEL.

Witnesses:
ETHEL A. KELLY,
J. WM. ELLIS.